United States Patent
Kircher et al.

(10) Patent No.: US 10,457,374 B2
(45) Date of Patent: Oct. 29, 2019

(54) AIRCRAFT CABIN ARRANGEMENT

(71) Applicant: Airbus Operations GmbH, Hamburg (DE)

(72) Inventors: Benedikt Kircher, Hamburg (DE); Paul Edwards, Hamburg (DE); Stephan Sontag, Hamburg (DE)

(73) Assignee: Airbus Operations GmbH, Hamburg (DE)

(*) Notice: Subject to any disclaimer, the term of this patent is extended or adjusted under 35 U.S.C. 154(b) by 0 days.

(21) Appl. No.: 14/619,509

(22) Filed: Feb. 11, 2015

(65) Prior Publication Data
US 2015/0232166 A1    Aug. 20, 2015

(30) Foreign Application Priority Data

Feb. 14, 2014  (DE) .......... 10 2014 202 783

(51) Int. Cl.
*B64C 1/06* (2006.01)
*B64D 11/00* (2006.01)

(52) U.S. Cl.
CPC .............. *B64C 1/066* (2013.01); *B64D 11/00* (2013.01); *B64D 2011/0038* (2013.01); *Y02T 50/46* (2013.01)

(58) Field of Classification Search
CPC .... B64D 2011/0038; B64D 2011/0046; B64D 11/00; B60Q 3/0283; B60Q 3/004;
(Continued)

(56) References Cited

U.S. PATENT DOCUMENTS 2,229,145 A      1/1941  Stewart
2,536,799 A  *   1/1951  Divizia ............... B60Q 3/0253
                                                        174/86
(Continued)

FOREIGN PATENT DOCUMENTS

DE        3713466 A1    11/1988
DE       29520271 U      4/1997
(Continued)

OTHER PUBLICATIONS

Search Report for German Application No. DE 10 2014 202 783.7 dated Nov. 6, 2014.
(Continued)

*Primary Examiner* — Medhat Badawi
*Assistant Examiner* — Christopher D Hutchens
(74) *Attorney, Agent, or Firm* — Jenkins, Wilson, Taylor & Hunt, P.A.

(57) ABSTRACT

An aircraft cabin arrangement is disclosed which extends in a rectilinear manner along a cabin axis, having a ceiling trim arrangement which delimits the cabin interior upwardly from the cabin axis, wherein the ceiling trim arrangement has a first, a second and a third row of ceiling trim elements, wherein the rows are arranged one immediately after another in the direction of extent of the cabin axis, wherein the rows have a central ceiling trim element and lateral ceiling trim elements, wherein the lateral ceiling trim elements of a row immediately adjoin the central ceiling trim element of the row in a laterally adjacent manner on both sides, perpendicularly to the cabin axis, wherein the lateral ceiling trim elements of the second row have one or more lighting sources, wherein the axial lengths of the ceiling trim elements of the first and the third row are different.

7 Claims, 3 Drawing Sheets

(58) Field of Classification Search
CPC ... B64C 1/066; B64C 11/0023; B64C 11/003; B61D 17/18
USPC .......................................................... D12/195
See application file for complete search history.

(56) References Cited

U.S. PATENT DOCUMENTS

| | | | |
|---|---|---|---|
| 2,582,738 A | | 1/1952 | Arenberg |
| 2,587,807 A | | 3/1952 | Arenberg |
| 3,210,875 A | | 10/1965 | Schwenkler |
| 3,211,904 A | | 10/1965 | Schwenkler |
| 3,358,134 A | | 12/1967 | Gonyea |
| 4,081,665 A | | 3/1978 | Corbeil |
| 5,113,322 A | | 5/1992 | Mikalonis |
| 5,129,597 A | | 7/1992 | Manthey |
| 5,558,425 A | | 9/1996 | Pons |
| 5,595,123 A | | 1/1997 | Tao et al. |
| 6,158,690 A | * | 12/2000 | Wadey .................... B64C 1/40 244/117 R |
| 6,547,184 B2 | | 4/2003 | Nieberle |
| 7,703,956 B2 | | 4/2010 | Wentland |
| 7,896,530 B2 | | 3/2011 | Budinger |
| 8,322,880 B2 | | 12/2012 | Vogel et al. |
| 8,814,093 B2 | | 8/2014 | Wuggetzer et al. |
| 9,051,051 B1 | * | 6/2015 | Biedscheid .......... B64D 11/003 |
| 9,701,423 B2 | | 7/2017 | Kircher et al. |
| 9,738,370 B2 | | 8/2017 | Kircher et al. |
| 2001/0050519 A1 | * | 12/2001 | Kasuya ................... B64D 11/04 312/315 |
| 2002/0041144 A1 | | 4/2002 | Fujishiro |
| 2003/0048641 A1 | | 3/2003 | Alexanderson et al. |
| 2005/0135093 A1 | | 6/2005 | Alexanderson |
| 2005/0211841 A1 | * | 9/2005 | Guard .................... B64C 1/066 244/119 |
| 2006/0237585 A1 | * | 10/2006 | Lau ........................ B64D 11/00 244/118.5 |
| 2007/0102577 A1 | * | 5/2007 | Saint-Jalmes ......... B64D 11/00 244/118.6 |
| 2007/0109802 A1 | * | 5/2007 | Bryan .................... B60Q 3/025 362/471 |
| 2008/0219013 A1 | | 9/2008 | Budinger |
| 2008/0266886 A1 | * | 10/2008 | Wentland ............... B64D 11/00 362/470 |
| 2009/0230245 A1 | * | 9/2009 | Mosler ............... B64D 11/0023 244/118.5 |
| 2009/0308977 A1 | * | 12/2009 | Larcher .................. B64C 1/062 244/129.5 |
| 2010/0014009 A1 | | 1/2010 | Stavaeus et al. |
| 2010/0157615 A1 | | 6/2010 | Gruhlke |
| 2011/0255296 A1 | * | 10/2011 | Hashberger ............ B64D 11/00 362/471 |
| 2012/0156420 A1 | * | 6/2012 | Greiner .................. B64C 1/066 428/101 |
| 2012/0224382 A1 | | 9/2012 | Petersohn et al. |
| 2014/0368113 A1 | * | 12/2014 | Eckel ................. H05B 33/0806 315/77 |
| 2015/0151850 A1 | | 6/2015 | Eakins |
| 2015/0232167 A1 | | 8/2015 | Kircher et al. |
| 2015/0232199 A1 | | 8/2015 | Kircher et al. |

FOREIGN PATENT DOCUMENTS

| | | |
|---|---|---|
| DE | 19825269 C2 | 4/2001 |
| DE | 10149194 A1 | 6/2002 |
| DE | 10231324 A1 | 1/2004 |
| DE | 10 2004/051146 A1 | 5/2006 |
| DE | 20 2007/006707 U1 | 7/2007 |
| DE | 10 2006/007285 A1 | 8/2007 |
| DE | 10 2006/042648 A1 | 3/2008 |
| DE | 10 2007/001702 A1 | 7/2008 |
| DE | 10 2007/020397 A1 | 10/2008 |
| DE | 10 2009/041597 A1 | 3/2011 |
| DE | 10 2011/013206 A1 | 9/2012 |
| EP | 1288123 B1 | 3/2005 |
| JP | 2013-091472 A | 5/2013 |

OTHER PUBLICATIONS

Search Report for German Application No. DE 10 2014 202 753.5 dated Nov. 5, 2014.
Non-Final Office Action for U.S. Appl. No. 14/619,690 dated Oct. 17, 2016.
Non-Final Office Action for U.S. Appl. No. 14/619,705 dated Apr. 5, 2016.
Notice of Allowance for U.S. Appl. No. 14/619,690 dated Mar. 28, 2017.

* cited by examiner

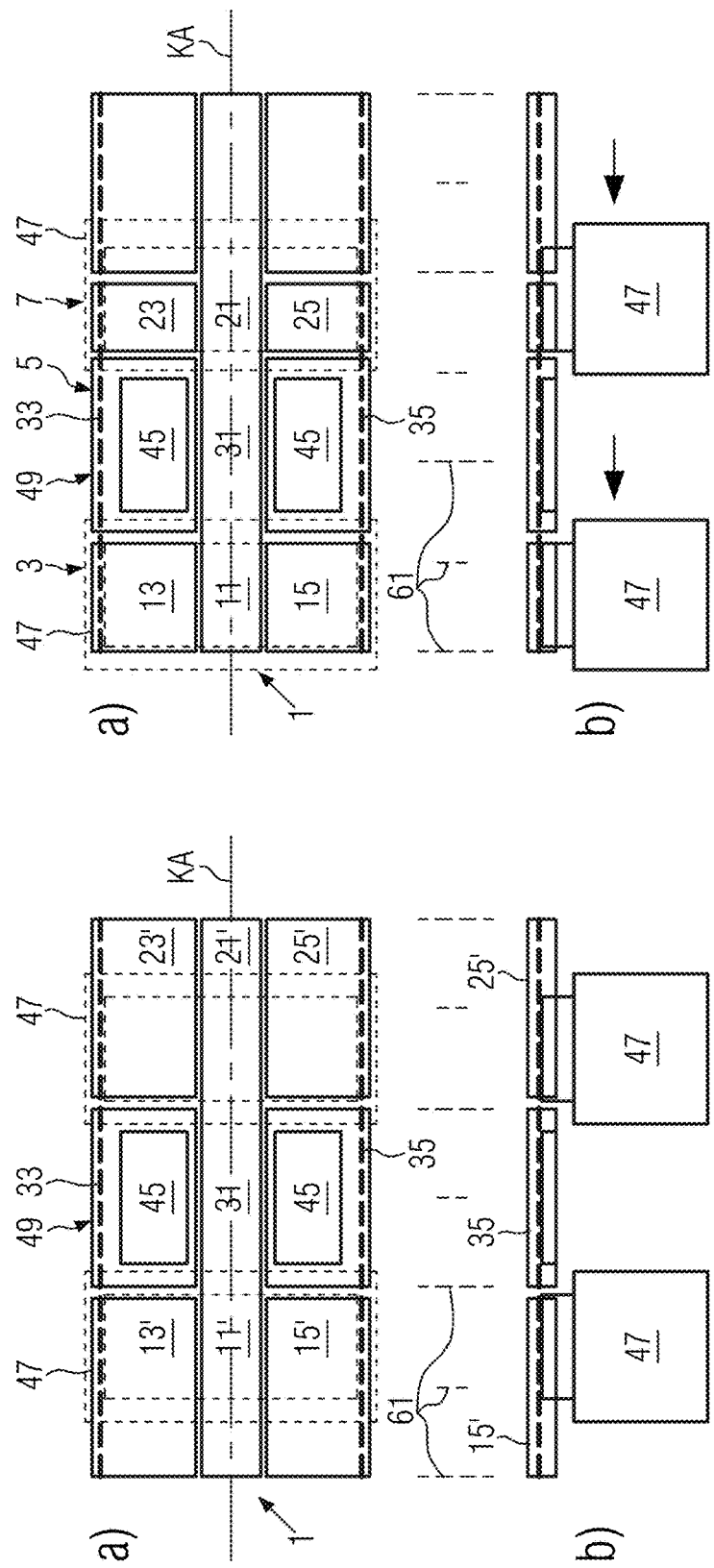

AIRCRAFT CABIN ARRANGEMENT

CROSS-REFERENCE TO RELATED APPLICATION

This application claims priority to German Patent Application No. 10 2014 202 783.7 filed Feb. 14, 2014, the entire disclosure of which is incorporated by reference herein.

TECHNICAL FIELD

The disclosure herein relates to an aircraft cabin arrangement for a passenger aircraft, which extends in a rectilinear manner along a cabin axis that extends centrally through the aircraft cabin arrangement.

BACKGROUND

Aircraft cabin arrangements are sufficiently well known from the prior art, wherein these arrangements have rows of seats arranged above a floor surface perpendicularly to a cabin axis extending centrally through the cabin arrangement, the rows of seats being in turn arranged one behind another. Furthermore, the cabin arrangements have a wall which delimits the interior of the cabin arrangement towards the aircraft fuselage, such that an intermediate space in which systems, supply devices and load-bearing parts of the fuselage are accommodated is formed between the outer wall and the actual outer skin of the aircraft. The outer wall has in this case a ceiling trim arrangement which is arranged above the cabin axis and upwardly delimits the cabin interior.

At this point, the technical problem arises whereby complex lighting scenarios are intended to be created in particular in the region between what are referred to as cabin elements arranged centrally in the cabin, or what are referred to as monuments, i.e. kitchen units or cabinets. This is particularly the case when the monuments are located opposite doors which are arranged laterally in the cabin and through which the passengers board the aircraft. Here, for aesthetic reasons, it is particularly desirable to create specially designed lighting scenarios.

However, only little room is available for lighting devices above the ceiling trim arrangement, since necessary systems (oxygen masks, loudspeakers etc.) for supplying passengers, for instance in the form of a central supply channel (PSC), are provided vertically above the centrally extending cabin axis lengthwise through the aircraft fuselage.

In addition, the use of a uniform carrier structure and the following of routes for electrical lines, for example, that extend in as rectilinear a manner as possible is desired over large parts of the aircraft (for instance for reasons of weight and common parts).

If the ceiling trim should not be arranged too low in the cabin arrangement so that the height of the interior would be reduced, the lighting devices should protrude to a comparatively little extent. This can be achieved in that the lighting devices are integrated into the ceiling trim arrangement, this being associated with considerable effort during manufacturing.

Furthermore, the ceiling trim arrangement is constructed such that it comprises rows of ceiling trim elements which are arranged one after another along the length of the cabin arrangement and extend transversely to the cabin axis, the rows of ceiling trim elements having a predetermined constant axial length, since ceiling trim elements are usually arranged in a pattern based on the frames of the cabin. In the axial direction, a ceiling trim element typically extends in this case from one frame to the next-but-one frame, such that one frame is always bridged and fastening elements for the ends of the ceiling trim elements are provided only at every second frame. In this way, weight can be saved as a result of the trim elements being held only at every second frame. However, it is also possible for the ceiling trim elements to span two frames and for holders to be provided only at every third frame.

The position of monuments is determined by the spacing of the rows of seats, however, and so it is possible for the case to arise in which a gangway to be illuminated that extends transversely to the cabin axis between two monuments is not located exactly centrally beneath one row of ceiling trim elements, but two adjacent rows extend above the gangway. If the gangway is intended to be illuminated in a complex manner, lighting devices have to be provided in ceiling trim elements of two adjacent rows, it not being necessary for the lighting devices to extend along the full axial length of the trim elements. This makes the construction of the corresponding ceiling trim elements difficult and dependent on where exactly the monuments are arranged and ultimately the spacing at which the rows of seats are located in the cabin.

SUMMARY

Proceeding from the prior art, it is therefore an object of the disclosure herein to configure an aircraft cabin arrangement such that the structural effort which is associated with the configuration of the ceiling trim arrangement in the region above crossways is kept as low as possible.

This object is achieved by an aircraft cabin arrangement which has a ceiling trim arrangement that delimits the cabin interior upwardly from the cabin axis, wherein the ceiling trim arrangement has a first, a second and a third row of ceiling trim elements, wherein the rows extend perpendicularly to the cabin axis and are arranged one immediately after another in the direction of extent of the cabin axis, such that the second row is arranged between the first and the third row.

Furthermore, the rows have a central ceiling trim element and lateral ceiling trim elements, or panels. The central ceiling trim element is arranged vertically above the cabin axis and the lateral ceiling trim elements of a row immediately adjoin the respective central ceiling trim element in a laterally adjacent manner on both sides, perpendicularly to the cabin axis. Furthermore, lighting sources are provided at least in the lateral ceiling trim elements of the second row, and the axial lengths of the ceiling trim elements of the first and the third row are different.

This makes it possible to arrange the ceiling trim elements of the second row in a centered manner over a crossway which extends perpendicularly to the cabin axis, such that the lighting sources arranged therein are aligned with the crossway. The axial length of the adjacent rows adjoining the second row in the axial direction is adapted such that the rows completely cover the intermediate space between further rows which adjoin in each case on that side of the first and third rows that faces away from the second row in the axial direction.

As a result, the ceiling trim elements of the second row can be positioned in a virtually unchanged manner, regardless of the axial position at which the crossway is situated. Possibly, connection elements such as plugs will have to be adapted. Only those rows of ceiling trim elements that are arranged immediately adjacent thereto have to have their lengths adapted. However, since these are comparatively easy to produce, since they do not have any lighting devices, the structural effort is considerably minimized here, while the ceiling trim elements of complex structure of the second row can be used in an unchanged form.

In the structure according to the disclosure herein, it is also possible to achieve the advantage whereby ceiling trim elements into which lighting sources are integrated and which have a small overall height can be used regardless of their axial position, wherein they do not encroach on the available space for the supply devices above the ceiling trim arrangement.

In a preferred embodiment, each row of the ceiling trim elements has an outer ceiling trim element in a laterally adjacent manner on that side of the lateral ceiling trim elements that is opposite the central ceiling trim element, the axial length of the outer ceiling trim element being identical in all rows. This means that the outer ceiling trim elements arranged laterally outside the central region of the ceiling trim arrangement can be formed in a uniform manner, while merely the ceiling trim elements forming the central region have to have their lengths adapted. In this case, it is further preferred for the axial length of the ceiling trim elements of the second row and those of the outer ceiling trim elements to be uniform. This axial length can be chosen such that it corresponds to twice the distance between two frames, and thus the outer ceiling trim elements extend in a conventional manner from one frame to the next-but-one frame and thus have to be held only by every second frame.

In a preferred embodiment, in particular the outer ceiling trim elements which are frequently provided axially at the level of doors can be provided with lighting devices in order to particularly illuminate the region adjacent to the doors.

In a further preferred embodiment, provision is made beneath the ceiling trim arrangement made up of the three rows of ceiling trim elements of a first and a second cabin element that extend upwardly from the floor of the cabin arrangement to the ceiling trim arrangement, wherein the cabin elements extend perpendicularly to the cabin axis beneath the central and the lateral ceiling trim elements. A gangway, which extends transversely to the cabin axis, is provided between the two cabin elements, which may be monuments such as cabinets or kitchen units, wherein the second row of ceiling trim elements, which have the lighting sources, is arranged vertically above the gangway and is preferably centered towards the gangway.

In this way, the arrangement according to the disclosure herein of the ceiling trim elements can be used in the region above crossways in which the arrangement of complex lighting scenarios is particularly advantageous.

In a further preferred manner, the cabin arrangement has two lateral access points, i.e. for example boarding doors, which are arranged in the lateral direction perpendicularly to the cabin axis, i.e. the opening plane extends parallel to the cabin axis. The lateral access points are arranged centrally with respect to the outer ceiling trim elements of the second row in the axial direction. This means that the central axis of the access points coincides with the center of the outer ceiling trim elements. This has the advantage that when the outer ceiling trim elements of the second row are provided with lighting elements, the latter are aligned with the doors and can thus illuminate the region in front of the access points symmetrically with respect to the central axis of the access points.

In this case, it is readily possible in the arrangement according to the disclosure herein for a crossway, above which the second row of ceiling trim elements is arranged, to be axially offset with respect to the central axis of the access points. However, this does not represent a problem because the position of the second row of ceiling trim elements above the gangway in the axial direction can be adapted by an appropriate choice of the axial lengths of the ceiling trim elements of the first and the third row.

In a further preferred manner, an angled element can be provided above the access points on that side of the outer ceiling trim elements that is remote from the lateral ceiling trim elements and therebeneath, the angled element having the same axial length as the outer ceiling elements, however, and being aligned with the latter.

Furthermore, the angled element can have a lighting element extending along the axial length thereof, the lighting element then also serving to produce a lighting scenario symmetrically to the central axis of the access point.

Moreover, a lighting element that extends likewise axially can be provided above the angled element, the lighting element being able to shine on the outer ceiling trim element from below, such that aesthetically pleasing lighting conditions which can also be varied over time can be created here.

Finally, in a further preferred embodiment, the outer ceiling trim elements can be configured such that they extend towards the cabin axis over that edge of the lateral ceiling trim elements that faces away from the central ceiling trim element and points laterally outwards, such that a gap that extends in the vertical direction is formed between the outer ceiling trim elements and the lateral ceiling trim elements, the gap then extending parallel to the cabin axis. A lighting element that is aligned with the outer ceiling trim element can be arranged in this gap, it being possible for the lighting element then likewise to be able to ensure complex lighting beneath the outer ceiling trim element, wherein this also takes place in a space-saving manner.

BRIEF DESCRIPTION OF THE DRAWINGS

The disclosure herein is explained in the following text with reference to a drawing showing merely preferred exemplary embodiments, wherein:

FIG. 3 shows a ceiling trim arrangement according to the prior art; and

FIG. 4 shows a ceiling trim arrangement according to the disclosure herein in plan view and from the side.

DETAILED DESCRIPTION

Figure 1:
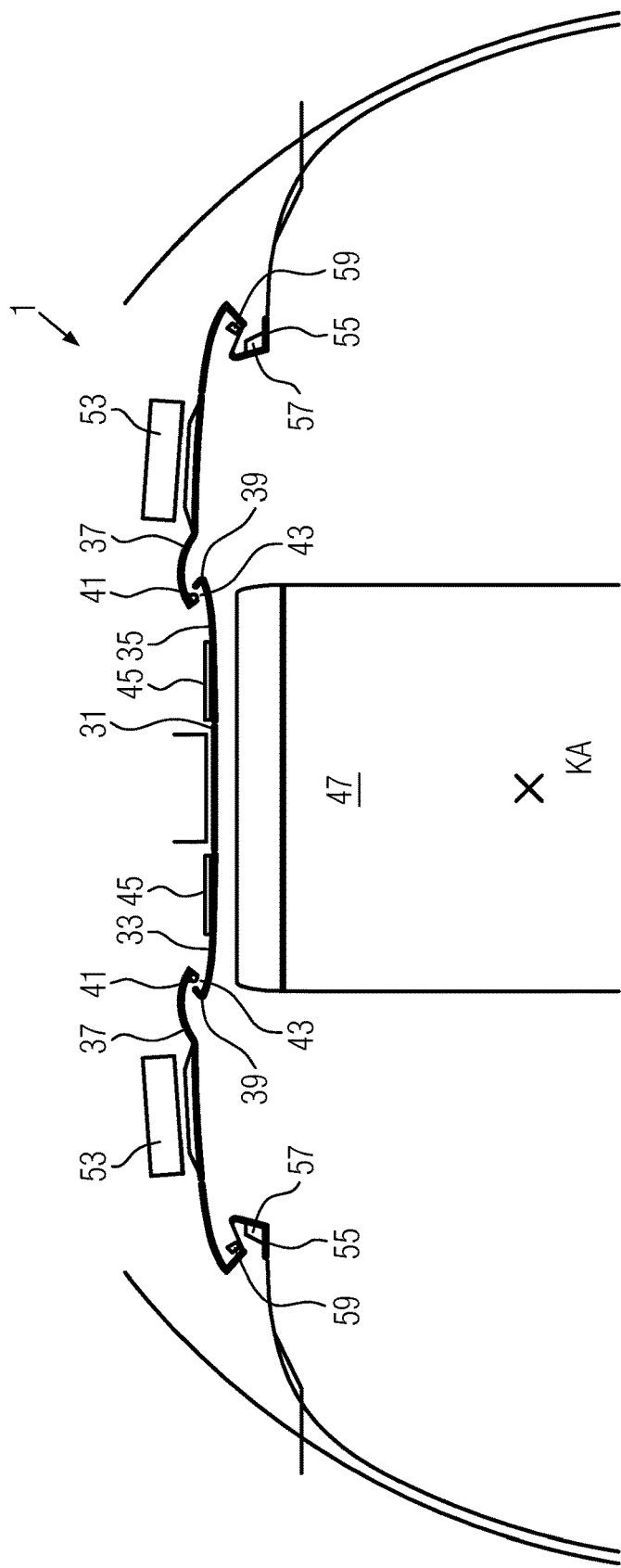
FIG. 1 shows an exemplary embodiment of the aircraft cabin arrangement according to the disclosure herein in cross section.

FIG. 1 shows the exemplary embodiment of a cabin arrangement according to the disclosure herein in cross section. The cabin arrangement extends in a rectilinear manner along a cabin axis KA extending centrally through the cabin arrangement, wherein rectilinear means here that the distances at which lateral elements are located from the cabin axis KA in a direction perpendicular thereto are substantially constant. Only at the ends of the cabin arrangement does this not apply.

Within the cabin arrangement, a multiplicity of rows of seats can be provided, wherein these rows are arranged one after another and extend perpendicularly to the cabin axis. The cabin arrangement also has an outer wall which delimits the interior of the cabin, wherein an intermediate space, in which load-bearing elements, insulating elements, supply devices and further systems of the aircraft are accommodated, is formed between the outer wall and the actual outer skin. The outer wall comprises in particular a ceiling trim arrangement 1 which upwardly delimits the cabin interior and is arranged above the cabin axis KA.

Figure 2:
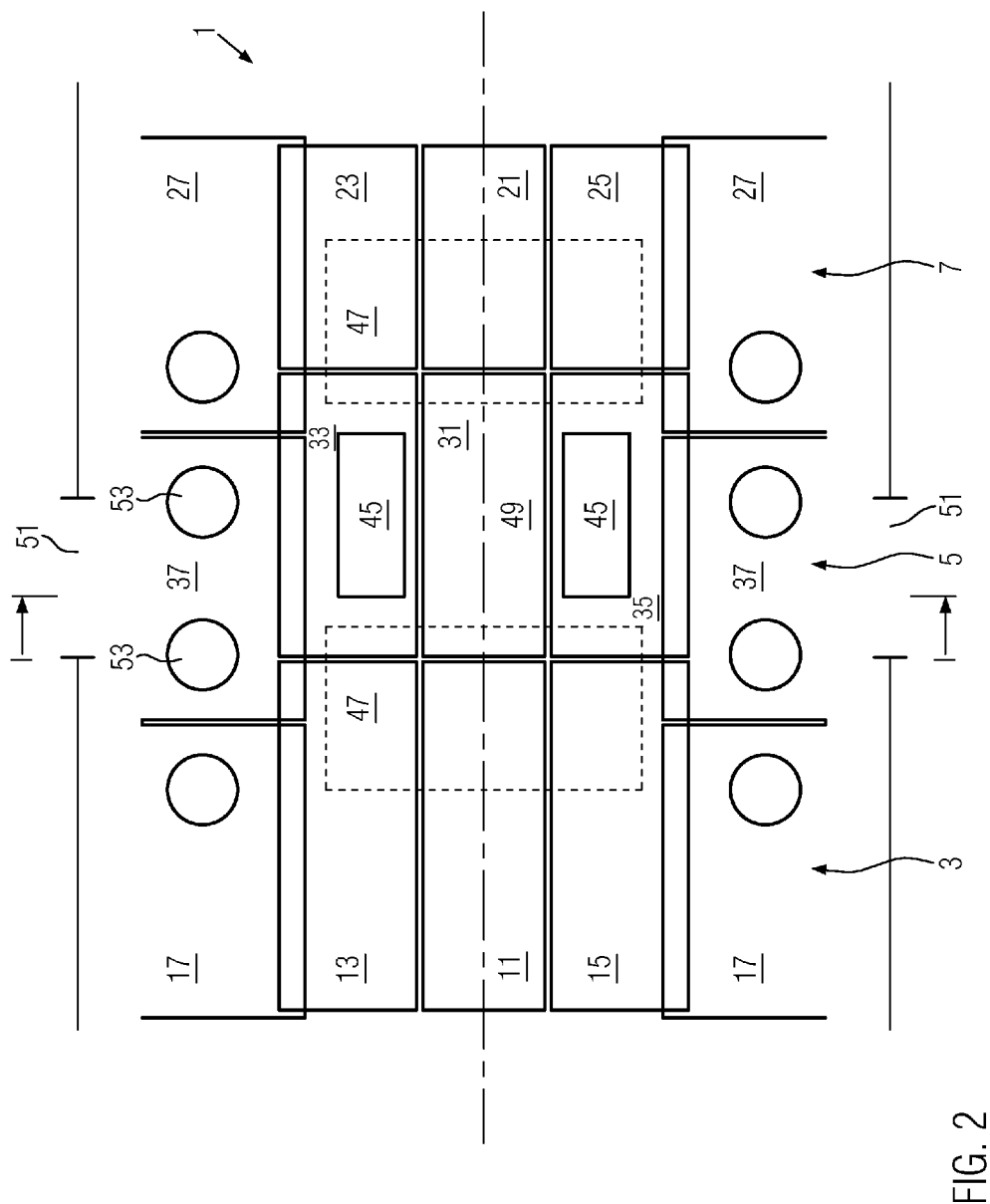
FIG. 2 illustrates the arrangement from FIG. 1 in plan view.

As FIG. 2 shows, the ceiling trim arrangement 1 has a first row 3, a second row 5 and a third row 7 of ceiling trim elements, wherein the rows extend in an adjacent manner one immediately after another perpendicularly to the cabin axis KA and wherein the second row 5 is arranged between the first and third rows 3, 7.

The first row 3 has a central ceiling trim element 11 arranged vertically above the cabin axis, wherein lateral ceiling trim elements 13 and 15 are provided adjacent thereto in each case laterally, perpendicularly to the cabin axis KA. Analogously, the third row 7 also has a central ceiling trim element 21 and lateral ceiling trim elements 23 and 25 which are likewise arranged on both sides of the central ceiling trim element 21 of the third row 7.

Arranged between the elements of the first and third rows 3, 7 are a central ceiling trim element 31 and lateral ceiling trim elements 33 and 35 of the second row 5. The ceiling trim elements of the first and third rows 3, 7 have axial lengths in the direction of the cabin axis KA that differ from one another. Furthermore, the axial lengths thereof also differ from the axial lengths of the ceiling trim elements 31, 33, 35 of the second row 5.

As can also be seen from FIG. 2, the rows 3, 5, 7 each have, on that side of the lateral ceiling trim elements 13, 15, 23, 25, 33, 35 that faces away from the central ceiling trim element 11, 21, 31, an outer ceiling element 17, 27, 37 which is likewise part of the ceiling trim arrangement 1.

As can be seen from FIG. 1, the outer ceiling trim elements 37 are arranged such that they cover that edge 39 of the lateral ceiling trim elements 33, 35 that faces away from the central ceiling trim element 31, on the side facing away from the cabin axis KA, or furthermore extend towards the cabin axis KA. The outer ceiling trim elements 37 thus extend here above the lateral ceiling trim elements 33, 35.

As a result, a gap that extends in the vertical direction is formed between the outer ceiling trim elements 37 and the lateral ceiling trim elements 33, 35, a lighting element 43 being arranged in the gap, as illustrated in FIG. 1, the lighting element 43 extending in the axial direction parallel to the cabin axis KA. This lighting element 43 is configured to illuminate the adjacent outer ceiling trim element 37.

As can also be seen in FIGS. 1 and 2, the lateral ceiling trim elements 33, 35 of the second row 5 have lighting sources 45 which are oriented onto the region beneath the ceiling trim elements 31, 33, 35. The outer ceiling trim elements 37 of the second row 5, too, are provided with lighting elements 53 which light a crossway, located thereebeneath, between two cabin elements 47. The cabin elements 47, which may be for example cabinets or a kitchen unit, extend from the floor of the cabin to close to the ceiling trim arrangement 1 and have such a width transversely to the cabin axis KA that they fill the space beneath the central ceiling trim element and the lateral ceiling trim elements.

These cabin elements 47 are generally referred to as "monuments". Provided between these cabin elements 47 is the crossway 49, which extends from one side of the cabin arrangement, transversely to the cabin axis KA, to the other side. In this case, the central ceiling trim element 31 and the lateral ceiling trim elements 33, 35 of the second row 5 are arranged in a centered manner with respect to the crossway 49 on account of the changed axial lengths of the ceiling trim elements 11, 13, 15; 21, 23, 25 of the first and third rows 3, 7, and so the lighting sources 45 are also aligned in a centered manner with the crossway 49. "Centered" means here that, in the axial direction parallel to the cabin axis KA, both the center of the ceiling trim elements 31, 33, 35 and of the lighting sources 45 is located vertically above the center axis of the crossway 49.

It is clear from this that, on account of the deviating axial lengths of the ceiling trim elements 11, 13, 15, 21, 23, 27 of the first and third rows 3, 7, it is possible to center the ceiling trim elements 33, 35, provided with lighting sources 45, of the second row 5 relative to the crossway 49, without these having to be adapted to the specific installation situation. In particular, it is not necessary for the position of the lighting sources 45 on the lateral ceiling trim elements 35, 33 to have to be changed. This minimizes the effort for the construction of the ceiling trim arrangement 1.

The outer ceiling trim elements 17, 27, 37 have a uniform axial length, which corresponds to twice the distance between two frames of the outer skin, such that the outer ceiling trim elements 37 extend beyond one frame. This is explained in connection with FIGS. 2 and 4. The outer ceiling trim elements 37 of the second row 5 are aligned with access points 51 in the side region of the cabin arrangement, wherein these outer ceiling trim elements 37 have lighting elements 53 which light the region beneath the outer ceiling trim element 37 and adjacent to the doors 51.

As can also be seen in FIG. 1, beneath the outer ceiling trim elements 37 and remote from the lateral ceiling trim elements 33, 35, angled elements 55 are arranged above the doors 51, wherein these angled elements 55 have a lighting element 57 extending in the axial direction parallel to the cabin axis, the lighting element 57 being able to illuminate the region towards the cabin axis KA.

Furthermore, above the angled elements 55, provision is made of further lighting elements 59 which likewise extend axially over the section of the second row 5 and which are configured such that they light the outer ceiling trim elements 37 of the second row from below. The lighting sources 45 on the lateral ceiling trim elements 33, 35 of the second row 5 and the lighting elements 43, 53, 59 in the region of the outer ceiling trim elements 37 make it possible as a whole to produce complex variable lighting scenarios in the region of the access points 51 and the crossway 49, the lighting scenarios being perceived by passengers newly entering the cabin.

The advantage of the construction according to the disclosure herein of the ceiling trim arrangement 1 can be understood with reference to FIGS. 3 and 4. These figures show ceiling trim arrangements according to the prior art (FIG. 3) and according to the disclosure herein (FIG. 4), wherein part a) is a plan view and part b) is a side view.

In the case of the ceiling trim arrangement 1' according to the prior art, the central ceiling trim elements 11, 21, 31 and the lateral ceiling trim elements 13, 15, 23, 25, 33, 35 are all the same axial length in the direction of the cabin axis KA. In this case, this length corresponds to twice the distance between two frames 61, which are indicated only schematically in FIGS. 3 and 4. Thus, a ceiling trim element always extends in the axial direction beyond one frame 61 and is held only by every second frame.

In such an arrangement, it is necessary for cabin elements 47 to be aligned correctly with the frames 61 in order that ceiling trim elements 33, 35 provided with lighting sources 45 can be aligned with a crossway 49 extending between the cabin elements 47. If the cabin elements 47 were not aligned with the frames 61 in the illustrated manner, the ceiling trim elements 33, 35, or the lighting sources 45 fitted therein, would have to be adapted in terms of their axial position.

In the case of the ceiling trim arrangement 1 according to the disclosure herein, this is, as FIG. 4 shows, not necessary. Here, although the cabin elements 47 are not aligned with the frames 61 in a matching manner, it is possible to use lateral ceiling trim elements 33, 35 which have an axial length that corresponds to twice the distance between two frames 61, and are provided with lighting sources 45 arranged in a centered manner. These are nevertheless arranged in a centered manner with respect to the crossway 49 on account of the ceiling trim elements of the first and third rows 3, 7, which have axial lengths different from the ceiling trim elements of the second row 5.

All that is necessary is to adapt the lengths of the ceiling trim elements of the first and third rows 3, 7 if, on account of the distances between the rows of seats not illustrated, cabin elements 47 are intended not to be aligned in a suitable manner with the frames 61. This reduces the structural effort which has to be made in order to match the ceiling trim arrangement 1, with which complex lighting scenarios can be achieved, to desired arrangements of the cabin elements 47 within a cabin arrangement.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft cabin arrangement which extends in a rectilinear manner along a cabin axis that extends centrally through the aircraft cabin arrangement, comprising:
   a ceiling trim arrangement which delimits a cabin interior upwardly from the cabin axis,
   a first and a second cabin element beneath the ceiling trim arrangement that extend upwardly from a floor of the cabin arrangement to the ceiling trim arrangement,
   a gangway disposed between the first and second cabin elements,
   wherein the ceiling trim arrangement has a first, a second and a third row of ceiling trim elements;
   wherein the rows extend perpendicularly to the cabin axis;
   wherein the rows are arranged one immediately after another in a direction of the cabin axis such that the second row is arranged between the first and the third row;
   wherein each row has a central ceiling trim panel and two lateral ceiling trim panels;
   wherein the central ceiling trim panels are arranged vertically above the cabin axis;
   wherein the lateral ceiling trim panels of a row immediately adjoin the central ceiling trim panels of the row in a laterally adjacent manner on both sides, perpendicularly to the cabin axis;
   wherein the lateral ceiling trim panels of the second row have one or more lighting sources;
   wherein the first and second cabin elements extend perpendicularly to the cabin axis beneath the central and lateral ceiling trim panels;
   wherein axial lengths of the central and lateral ceiling trim panels are adapted such that the second row of ceiling trim panels is arranged vertically above the gangway,
   wherein the axial lengths of the central and lateral ceiling trim panels of the first and the third row are different from the axial lengths of the central and lateral ceiling trim panels of the second row,
   wherein each row has outer ceiling trim elements in a laterally adjacent manner on the side of the lateral ceiling trim panels which is opposite the central ceiling trim panel, perpendicular to the cabin axis,
   wherein the axial lengths of the outer ceiling trim elements of the three rows are identical to one another and are equal to the axial lengths of the central and lateral ceiling trim panels of the second row, and
   wherein the lateral ceiling trim panels of each row are formed separately from one another.

2. The aircraft cabin arrangement according to claim 1, wherein the central ceiling trim panel, the lateral ceiling trim panels, and the outer ceiling trim elements of the second row all have a same axial length.

3. The aircraft cabin arrangement according to claim 1, wherein the outer ceiling trim elements of the second row have lighting devices.

4. The aircraft cabin arrangement according to claim 1, wherein the aircraft cabin arrangement has two lateral access points which are arranged in a lateral direction perpendicular to the cabin axis, and
   wherein the lateral access points are arranged centrally with respect to the outer ceiling trim elements of the second row in the direction of the cabin axis.

5. The aircraft cabin arrangement according to claim 4, wherein an angled element is provided above the access points on a side of the outer ceiling trim elements opposite the lateral ceiling trim panels and beneath the lateral ceiling trim panels, the angled element having the same axial length as the outer ceiling trim element and being oriented with respect to the latter,
   wherein the angled element has a lighting element extending along the axial length of the angled element.

6. The aircraft cabin arrangement according to claim 5, wherein a further lighting element extending parallel to the cabin axis is provided above the angled element, the further lighting element being oriented such that it casts light on the outer ceiling trim element of the second row.

7. The aircraft cabin arrangement according to claim 1, wherein the outer ceiling trim elements extend towards the cabin axis over the edge of the lateral ceiling trim panels which faces away from the central ceiling trim panel and points laterally outwards, on the side of the lateral ceiling trim panels which faces away from the cabin axis,
   wherein a gap that extends in a vertical direction is formed between the outer ceiling trim elements and the lateral ceiling trim panels, the gap extending parallel to the cabin axis, and
   wherein lighting elements that are oriented with respect to the outer ceiling trim elements are arranged in the gap.

* * * * *